United States Patent
Wang et al.

(10) Patent No.: US 6,799,102 B2
(45) Date of Patent: Sep. 28, 2004

(54) AUTOMATIC CLIMATE CONTROL WITH TUNABLE TRANSIENT RESPONSE

(75) Inventors: Mingyu Wang, Amherst, NY (US); John Lawrence Pawlak, III, Orchard Park, NY (US); Charles Andrew Archibald, Lockport, NY (US); John M. Kirchberger, Gasport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/293,031

(22) Filed: Nov. 13, 2002

(65) Prior Publication Data

US 2003/0204292 A1 Oct. 30, 2003

Related U.S. Application Data

(60) Provisional application No. 60/375,300, filed on Apr. 24, 2002.

(51) Int. Cl.[7] .............................. F24F 7/00; G05D 23/00
(52) U.S. Cl. ......................................... 701/36; 236/49.3
(58) Field of Search ....................... 701/36, 1; 700/276; 236/49.3; 454/258

(56) References Cited

U.S. PATENT DOCUMENTS

| | | | | |
|---|---|---|---|---|
| 4,938,033 A | * | 7/1990 | Ogihara et al. | 62/186 |
| 5,832,990 A | * | 11/1998 | Eisenhour | 165/202 |
| 6,173,902 B1 | * | 1/2001 | Bauer et al. | 236/49.3 |
| 6,186,883 B1 | * | 2/2001 | Baker | 454/75 |
| 6,298,911 B1 | * | 10/2001 | Volz et al. | 165/202 |
| 6,616,057 B1 | * | 9/2003 | Kelly et al. | 236/49.3 |
| 6,651,895 B1 | * | 11/2003 | Kadle et al. | 236/49.3 |

* cited by examiner

Primary Examiner—Michael J. Zanelli
(74) Attorney, Agent, or Firm—Patrick M. Griffin

(57) ABSTRACT

An improved motor vehicle automatic climate control methodology develops HVAC commands for transient phase operation independent of the HVAC commands calibrated for steady-state phase operation. At system activation, a transient phase indicator is initialized based on the cabin temperature and the set temperature, and thereafter updated to reflect progress toward steady-state phase operation. The steady-state HVAC commands are based on ambient conditions and the set temperature, and the HVAC commands at system activation are based on the steady-state commands and offsets based on the initial in-car temperature. A transient modifier based on the transient phase indicator brings the initial HVAC commands into correspondence with the steady-state HVAC commands as the cabin temperature approaches the set temperature. The transient modifier can be a power function of the transient phase indicator, and the HVAC commands can be clamped at the initial values until the transient phase indicator reflects a predetermined amount of progress toward the steady-state phase.

15 Claims, 5 Drawing Sheets

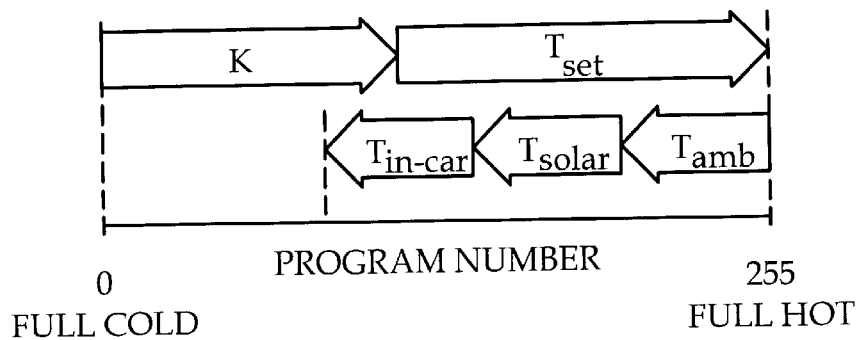
FIG. 1A - PRIOR ART
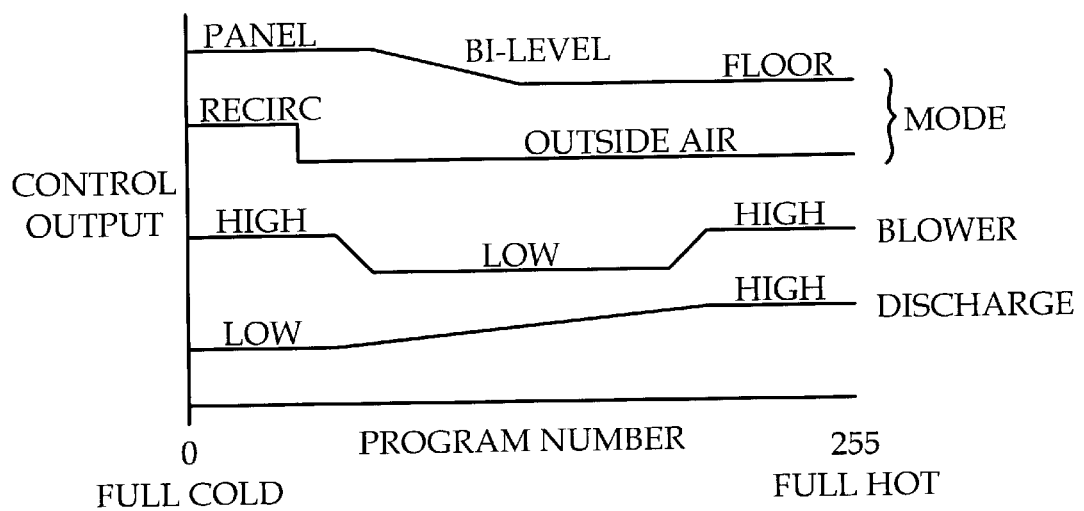
FIG. 1B - PRIOR ART
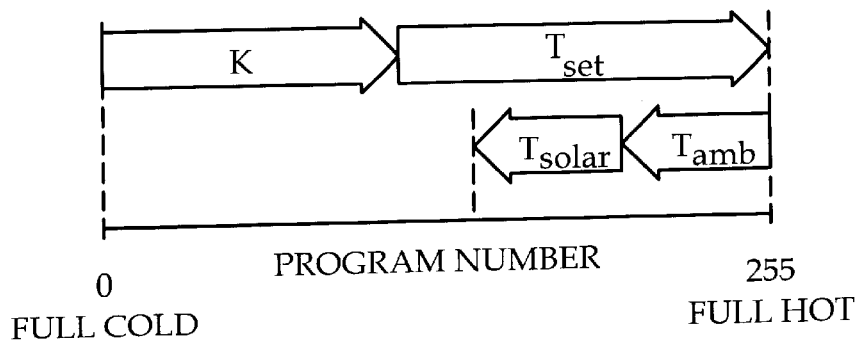
FIG. 2

AUTOMATIC CLIMATE CONTROL WITH TUNABLE TRANSIENT RESPONSE

PRIOR APPLICATION

This application claims the benefit of previously filed Provisional Patent Application Ser. No. 60/375,300 filed Apr. 24, 2002.

TECHNICAL FIELD

This invention relates to an automatic climate control for a motor vehicle heating, ventilation and air-conditioning (HVAC) system, and more particularly to a control that enables separate calibration of the transient and steady-state control phases.

BACKGROUND OF THE INVENTION

The operation of a vehicle automatic climate control can be characterized as including a transient phase and a steady-state phase. The transient phase ordinarily commences when the control is activated and the cabin temperature is uncomfortably warm or cool. In this situation, the control objective is to choose HVAC settings (such as blower speed and air discharge temperature) that will quickly take the cabin to a neutral reference temperature, such as 75° F. The steady-state phase follows the transient phase, and adjusts the HVAC settings as required to maintain the cabin at the reference temperature (or some other desired temperature) as the ambient temperature or solar loading vary.

A common way of carrying out the above-described control is to estimate the required heating or cooling effort of the HVAC system based on ambient temperature, solar loading, and so on, and to schedule the blower speed and air discharge temperature in a pre-programmed fashion based on the required effort. An example of such a system is shown in FIGS. 1A and 1B, where an occupant set temperature Tset, and measures or estimates of ambient temperature Tamb, solar intensity Tsolar and cabin air temperature Tin-car are combined with a constant K to form a Program Number (PN) that represents the required effort of the HVAC system. As indicated in FIG. 1A, PN decreases in response to increasing values of Tamb, Tsolar and Tin-car to provide increased cooling, and increases in response to increasing values of Tset to provide increased heating. As indicated in FIG. 1B, the blower speed (BLS), the air discharge temperature (ADT) and the air inlet and discharge locations (MODE) are then scheduled as a function of PN. Typically, the HVAC settings and program number gains are calibrated for steady-state operation—that is, so that the reference temperature will be maintained under various ambient conditions. The same schedule of HVAC settings is used under transient conditions, where the value of Tin-car following an ambient-soak condition biases PN to a high or low initial value that evokes a strong heating or cooling response. For example, when the system is activated following a hot-soak period (after several hours in a parking lot on a hot sunny day, for example), Tin-car is relatively high; this produced a PN value that is relatively low, and the HVAC schedule calls for a high blower speed and low air discharge temperature. As the cabin temperature and Tin-car are reduced, PN increases, and the blower speed and air discharge temperatures follow the pre-programmed schedule. When Tin-car reaches the reference temperature (or Tset), the transient phase is considered to be concluded, and the system operates in the steady-state phase.

A drawback of the control approach described in the preceding paragraph is that the system response during the transient phase is defined by a schedule that is calibrated for the steady-state phase. Consequently, the transient response can only be changed by changing the steady state response; and conversely, changing the steady-state settings also changes the transient response. In other words, calibration engineer can optimize either the steady-state phase performance or the transient phase performance, but not both. Typically, the HVAC settings are calibrated to optimize the steady-state phase performance, and the transient phase performance remains sub-optimal. Accordingly, what is needed is an improved climate control methodology that does not suffer from this limitation.

SUMMARY OF THE INVENTION

The present invention is directed to an improved motor vehicle automatic climate control methodology in which HVAC commands for transient phase operation are developed independent of the HVAC commands calibrated for steady-state phase operation. At system activation, a transient phase indicator is initialized based on the cabin temperature and the set temperature, and thereafter is updated to reflect progress toward steady-state phase operation. The steady-state HVAC commands are based on ambient conditions and the set temperature, and the HVAC commands at system activation are based on the steady-state commands and offsets based on the initial in-car temperature. A transient modifier based on the transient phase indicator brings the initial HVAC commands into correspondence with the steady-state HVAC commands as the cabin temperature approaches the set temperature. In a preferred embodiment, the transient modifier is a power function of the transient phase indicator, and the HVAC commands are clamped at the initial values until the transient phase indicator reflects a predetermined amount of progress toward the steady-state phase.

BRIEF DESCRIPTION OF THE DRAWINGS

FIGS. 1A and 1B illustrate a program number control methodology carried out by a prior art motor vehicle automatic climate control system. FIG. 1A illustrates formulation of a Program Number, and FIG. 1B illustrates pre-programmed control settings based on the formulated Program Number.

FIG. 2 illustrates the formulation of a Program Number according to this invention.

DESCRIPTION OF THE PREFERRED EMBODIMENTS

For convenience, the methodology of the present invention is described in the context of a climate control of the general type depicted in FIGS. 1A and 1B where a program number (PN) is computed and used to look-up pre-programmed values of blower speed (BLS), air discharge temperature (ADT), and air delivery mode (MODE). As a practical matter, however, the methodology of the present invention equally applies to other automatic climate control strategies, such as one in which an estimate of the HVAC heating or cooling power is used in place of the program number PN.

In general, the methodology of the present invention separates the transient phase and steady-state phase HVAC command calibration, while providing a smooth transition from the transient phase to the steady-state phase as the cabin temperature approaches the set temperature. This is achieved by calibrating schedules of blower speed and air discharge temperature based on ambient conditions (Tamb and Tsolar) and the set temperature Tset, initializing the blower speed and air discharge temperature commands BLS_CMD, ADT_CMD at system activation to quickly warm or cool the cabin, and then smoothly transitioning BLS_CMD and ADT_CMD to the scheduled steady-state values as cabin temperature (Tin-car) approaches Tset. In cases where the cabin needs to be warmed, the transient phase can be delayed until heat is available, particularly in cases where cabin heat is drawn from engine coolant.

FIG. 2 diagrammatically depicts the formation of the program number PN according to the present invention. Since the program number PN pertains solely to steady-state phase operation, and the corresponding blower speed and air discharge temperature schedules are calibrated to maintain the set temperature under various ambient conditions, the cabin temperature Tin-car no longer influences the program number PN. Rather, PN is determined as a function of a constant K, Tamb, Tsolar and Tset; algebraically, this may be expressed as:

$$PN=K+(G1*Tamb)+(G2*Tsolar)+(G3*Tset) \quad (1)$$

where Tamb is a measure of the ambient/outside temperature, Tsolar is a measure of the solar intensity, Tset is the occupant set temperature, and G1, G2 and G3 are calibrated gain terms. For clarity, the scheduled blower speed and air discharge temperatures are referred to herein as BLS_SS and ADT_SS, where the SS suffix denotes the steady-state phase.

Figure 3:
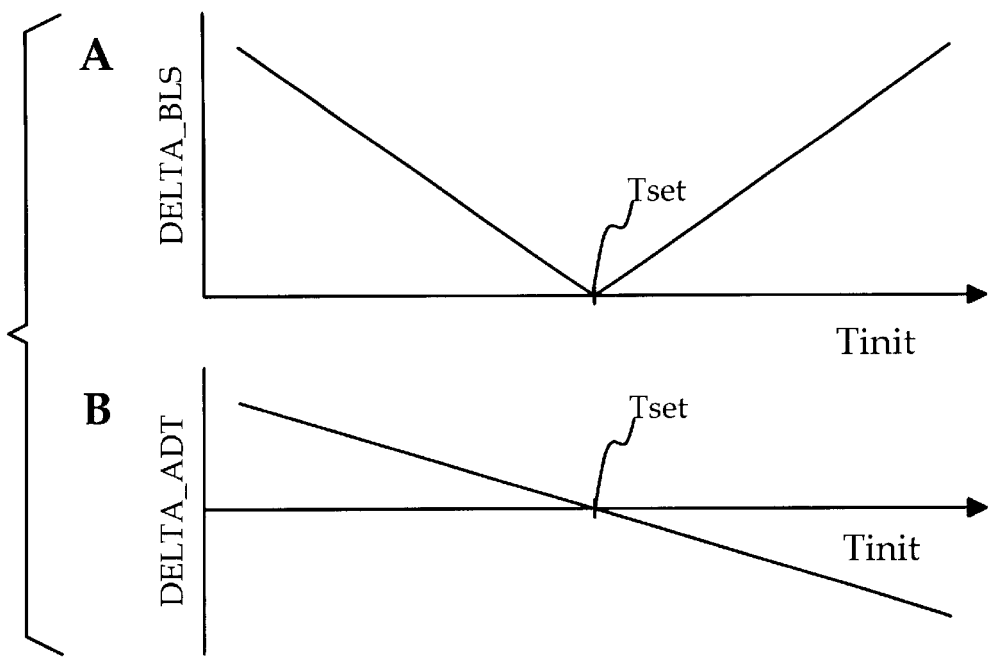
FIG. 3, Graphs A and B, depict transient phase offsets for blower speed and air discharge temperature according to this invention.

At system activation, the blower speed and air discharge temperature are initialized according to the sum of the steady-state commands BLS_SS, ADT_SS and respective offsets DELTA_BLS, DELTA_ADT. The offsets DELTA_BLS and DELTA_ADT are based on the initial in-car temperature Tinit, as depicted, for example, in Graphs A and B of FIG. 3. Referring to the graphs, DELTA_BLS is illustrated as being proportional to |(Tset−Tinit)|, while DELTA_ADT is illustrated as being proportional to (Tset−Tinit). Of course, the illustrated linear relationships (and the independent variable, for that matter) are merely exemplary, and may be adjusted to suit a particular application. Also, the initial blower speed and initial air discharge temperature may be determined based on Tinit, Tset, Tamb and Tsolar without regard to the calibrated steady state schedule, if desired.

Transitioning from the initial HVAC commands to the scheduled steady-state commands is achieved by gauging the progress of the transient phase (that is, the progress of bringing Tin-car into correspondence with Tset), and updating the HVAC commands based on the measured progress. A transient phase indicator (TPI) for gauging the progress of the transient phase is initialized based on Tinit and the Tset, and thereafter updated to reflect changes in Tin-car. In the illustrated embodiment TPI is calculated as a ratio according to the expression:

$$TPI=(Tin\text{-}car-Tset)/(Tinit-Tset) \quad (2)$$

At system activation, Tin-car=Tinit, and TPI has as value of one. As Tin-car deviates from Tinit and approaches Tset, TPI decreases, reaching zero when Tin-car reaches Tset.

While TPI itself could be used to linearly transition between the initial and steady state HVAC commands, it has been found that a linear transition usually results in sub-optimal transient performance since vehicle climate control is typically highly non-linear. Accordingly, a better approach is to define a configurable transition so that a system calibration engineer can tailor the transition as required to achieve optimal transient performance. This is achieved, according to the present invention, by defining a transient modifier TMOD that is a non-linear function of the transient phase indicator TPI, and forming the transient phase HVAC commands BLS_CMD and ADT_CMD as follows:

$$BLS\_CMD=BLS\_SS+(TMOD*DELTA\_BLS) \quad (3)$$

$$ADT\_CMD=ADT\_SS+(TMOD*DELTA\_ADT) \quad (4)$$

Alternatively, if the initial blower speed and initial air discharge temperature (BLS_INIT and ADT_INIT) are determined without regard to the calibrated steady state schedule, as suggested above, the transient phase HVAC commands BLS_CMD and ADT_CMD may be computed as:

$$BLS\_CMD=(TMOD*BLS\_INIT)+[(1-TMOD)*BLS\_SS] \quad (5)$$

$$ADT\_CMD=(TMOD*ADT\_INIT)+[(1-TMOD)*ADT\_SS] \quad (6)$$

Figure 4:
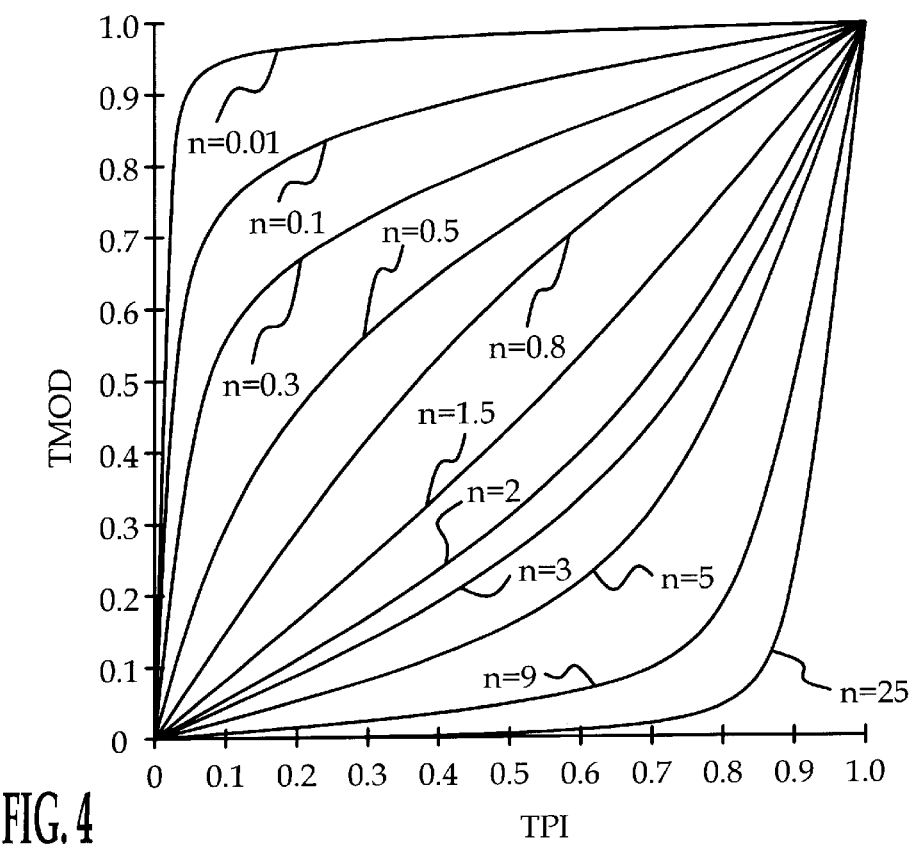
FIG. 4 graphically depicts a transient modifier according to a first embodiment of this invention.

According to a first embodiment of this invention, TMOD is a power function of TPI, as follows:

$$TMOD=TPI^n \quad (7)$$

where the exponent n is chosen to provide the desired response. FIG. 4 illustrates a variety of potential transient responses that can be obtained by appropriate selection of the exponent n. Specifically, FIG. 4 depicts the transient modifier TMOD as a function of the transient phase indicator TPI for values of the exponent n ranging from 0.01 to 25.0. As indicated, an exponent value of less than one will result in slow change in the initial HVAC commands as Tin-car deviates from Tinit, and a larger change as Tin-car nears Tset. On the other hand, an exponent value of greater than one will result in a large change in the initial HVAC commands as Tin-car deviates from Tinit, and a smaller change as Tin-car nears Tset. An exponent value of one results in a linear transition, as $TPI^1=TPI$.

According to a second embodiment of this invention, TMOD is additionally defined in terms of a threshold value $TPI_{thr}$ of the transient phase indicator TPI, as follows:

$$TMOD=1 \text{ for } TPI>=TPI_{thr}, TMOD=(TPI/TPI_{thr})^n \text{ for } TPI<TPI_{thr} \quad (8)$$

Figure 5:
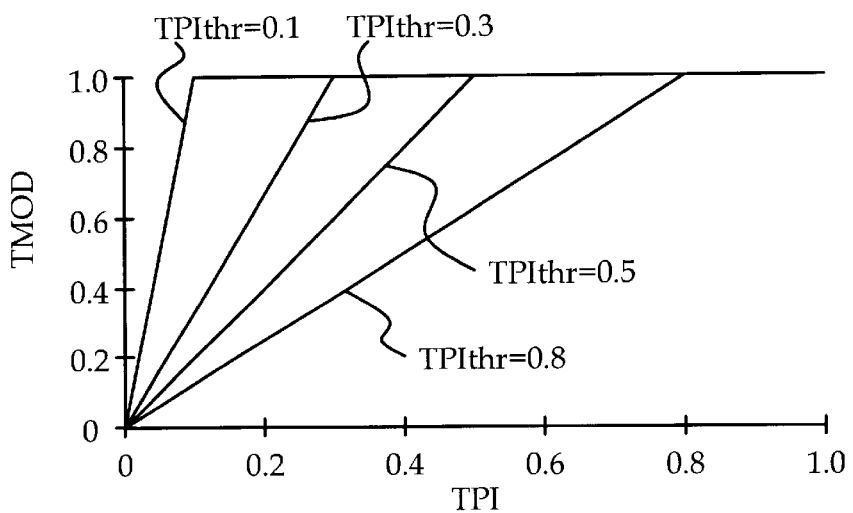
FIG. 5 graphically depicts a set of quasi-linear transient modifiers according to a second embodiment of this invention.
Figure 6:
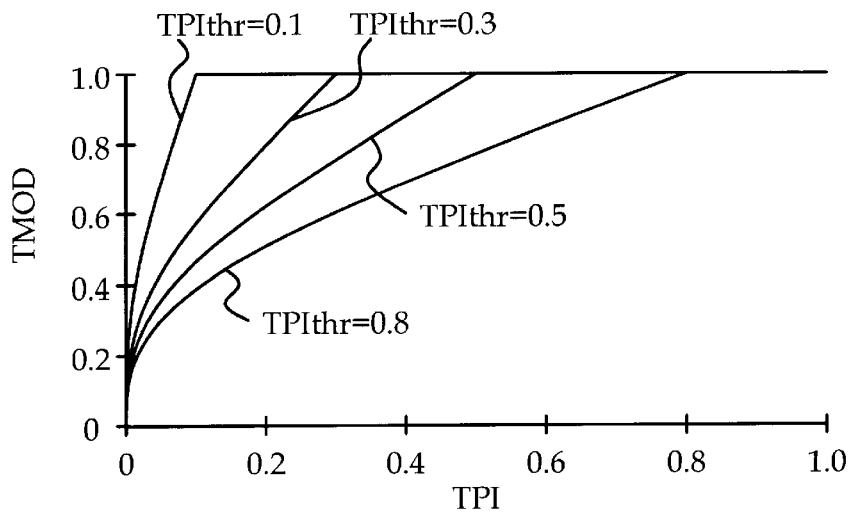
FIG. 6 graphically depicts a set of convex transient modifiers according to the second embodiment of this invention.
Figure 7:
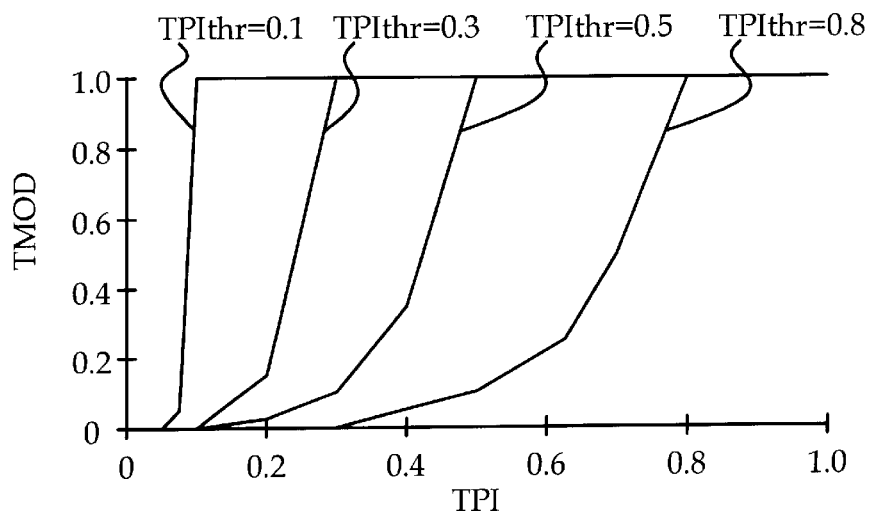
FIG. 7 graphically depicts a set of concave transient modifiers according to the second embodiment of this invention.
Figure 8:
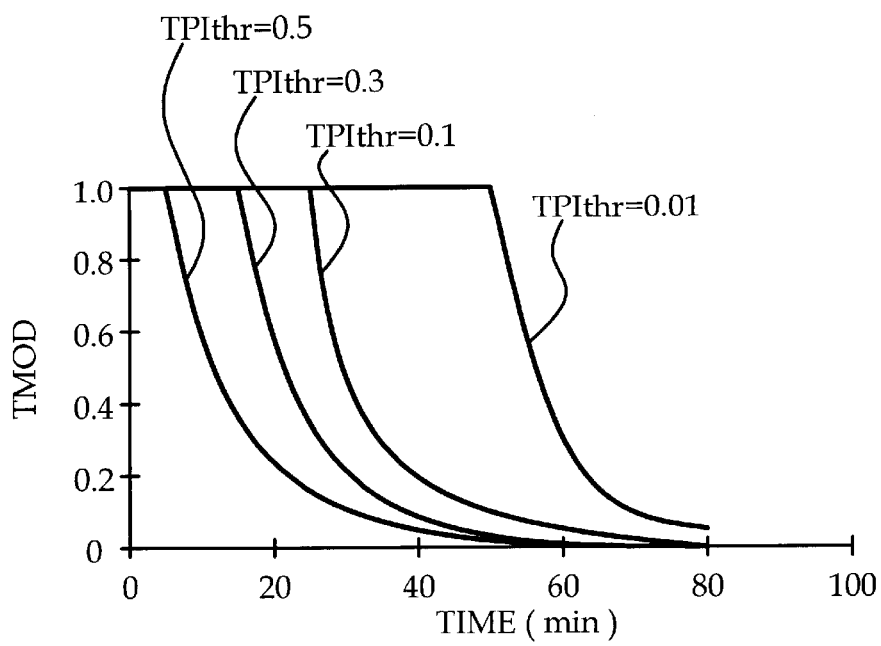
FIG. 8 graphically depicts a set of quasi-linear transient modifiers as a function of time according to the second embodiment of this invention.

In other words, the initial HVAC commands are retained (i.e., TMOD=1) until Tin-car progresses toward Tset by a specified percentage, whereafter the HVAC commands transition toward the scheduled steady-state values BLS_SS, ADT_SS. This effect is graphically illustrated in FIGS. 5, 6 and 7, which depict TMOD for various values of $TPI_{thr}$, given an exponent n. FIG. 5 illustrates a quasi-linear effect in which the exponent n has a value of one, and the threshold $TPI_{thr}$ varies from 0.1 to 0.8. FIG. 6 illustrates a convex effect in which the exponent n has a value of 0.3 and $TPI_{thr}$ again varies from 0.1 to 0.8. Finally, FIG. 7 illustrates a concave effect in which the exponent n has a value of 5.0 and $TPI_{thr}$ again varies from 0.1 to 0.8. FIG. 8 illustrates an effective change in TMOD as a function of time for an exponent value of one and various values of $TPI_{thr}$, assuming that the transient phase indicator TPI progresses exponentially from one to zero according to the function:

$$TPI = e^{-(t/10)} \quad (9)$$

Figure 9:
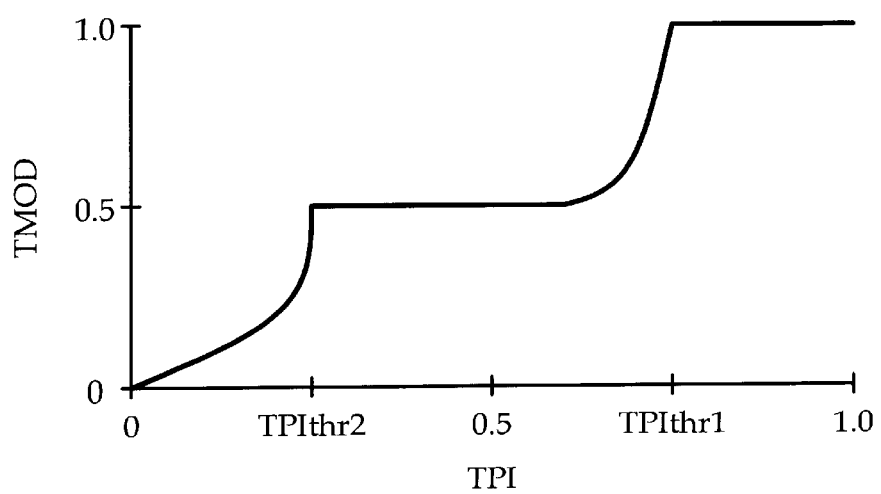
FIG. 9 graphically depicts a set of transient modifiers according to a variation of the second embodiment of this invention.

FIG. 9 illustrates a variation of the second embodiment in which the transient modifier TMOD decays to an intermediate level (0.5 in FIG. 9) once the transient phase indicator TPI reaches a first threshold $TPI_{thr1}$, and then decays from the intermediate level to zero when TPI reaches a second threshold $TPI_{thr2}$. Of course, more than one intermediate level of TMOD and two TPI thresholds can be used if desired.

From the above descriptions, it will be seen that with the control methodology of the present invention, the calibration engineer can not only tailor the transient response independent of the scheduled steady-state control settings, but also has one (in the case of the first embodiment) or two (in the case of the second embodiment) degrees of freedom in tailoring the transient response. From the viewpoint of the calibration engineer, choosing the exponent n and the threshold $TPI_{thr}$ so that the average value of TMOD is relatively high during the transient phase allows more HVAC power to be delivered, reducing the duration of the transient phase. Conversely, choosing the exponent n and the threshold $TPI_{thr}$ so that the average value of TMOD is relatively low during the transient phase results in less HVAC power being delivered, increasing the duration of the transient phase. Also, it is possible to provide several different transient response trajectories, and to configure the climate control to allow the occupant to select a desired trajectory, and/or to learn which of the trajectories is preferred by a given occupant, and then to automatically utilize the learned trajectory each time that occupant is identified.

Figure 10:
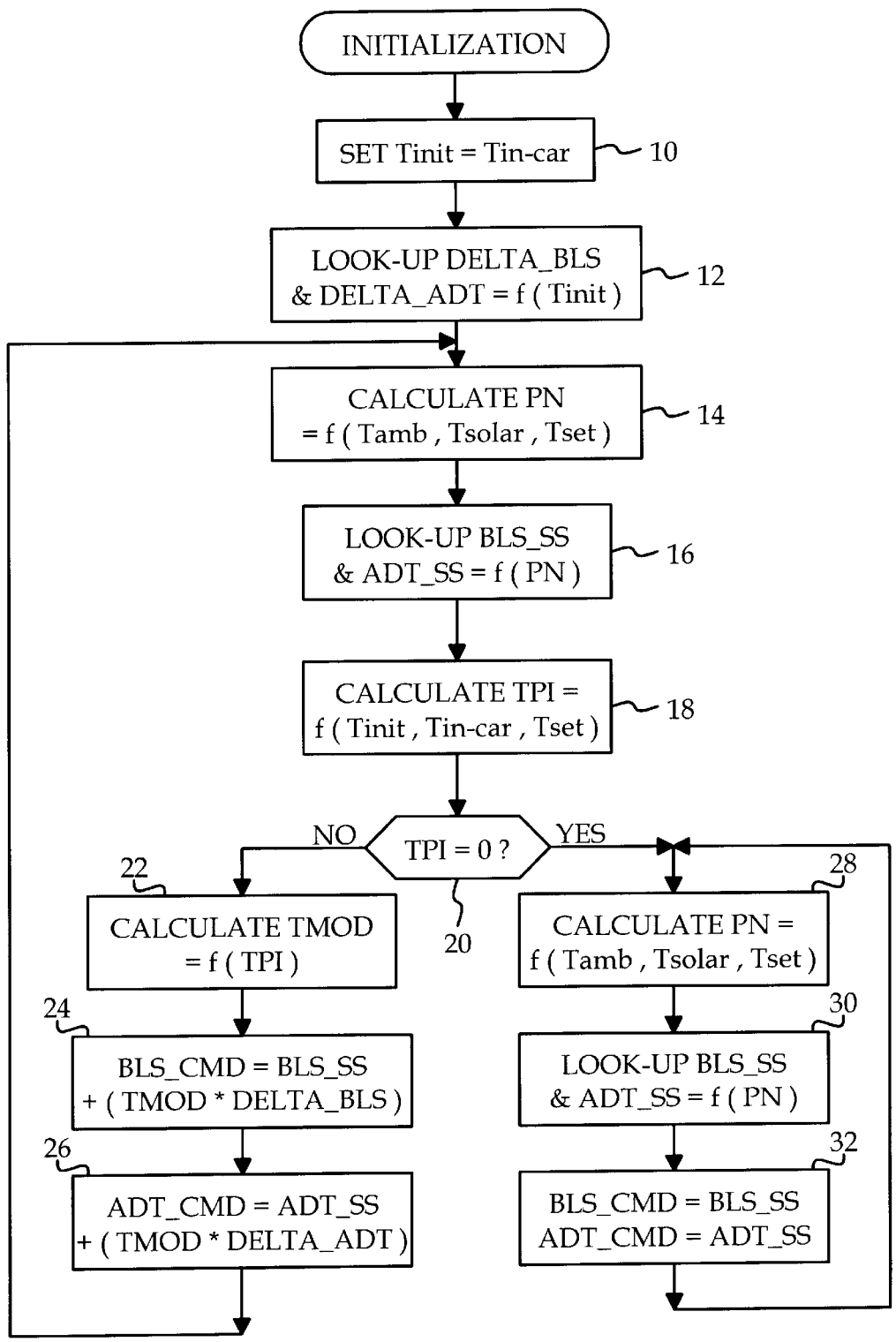
FIG. 10 is a flow diagram illustrating the control methodology of the present invention.

FIG. 10 depicts a flow diagram representative of software routine executed by a microprocessor-based controller of an automatic climate control system for carrying out the control methodology of the present invention. At activation of the automatic climate control system (which will usually, but need not necessarily, occur at the beginning of a period of vehicle operation), the blocks 10, 12, 14 and 16 are executed as shown. Block 10 sets Tinit equal to the cabin temperature Tin-car. Block 12 looks up offsets DELTA_BLS and DELTA_ADT based on Tinit, as described above in reference to Graphs A and B of FIG. 3. Block 14 calculates the program number PN according to equation (1) above, and block 16 looks up the scheduled steady-state blower speed and air discharge temperatures BLS_SS and ADT_SS as a function of PN. Thereafter, the block 18 is executed to calculate the transient phase indicator TPI according to equation (2) above. Initially, TPI will have a value of one so that block 20 is answered in the negative, and the blocks 22, 24 and 26 are executed to determine HVAC commands BLS_CMD, ADT_CMD for the transient phase. The block 22 calculates the transient modifier TMOD according to equations (7) or (8) above, the blocks 24 and 26 compute the commands BLS_CMD and ADT_CMD according to equations (3) and (4), respectively. The blocks 14–26 are then re-executed as shown until block 20 detects that TPI has decayed substantially to zero. At such point, the blocks 28, 30 and 32 are executed as shown. The block 28 calculates the program number PN according to equation (1) above, the block 30 looks up the scheduled steady-state blower speed and air discharge temperatures BLS_SS and ADT_SS as a function of PN, and the block 32 sets the commands BLS_CMD and ADT_CMD to the scheduled steady-state values BLS_SS and ADT_SS.

In summary, the automatic climate control of this invention effectively separates the scheduling of steady-state HVAC commands from the response of the system during the transient phase of the control, and offers the calibration engineer one or more degrees of freedom in optimizing the transient response for a particular type vehicle environment. While this invention has been described in reference to the illustrated embodiments, it is expected that various modifications in addition to those suggested above will occur to those skilled in the art. For example, the control of this invention may be applied to additional or fewer climate control commands. Also, the functions used to determine TMOD may be either calculated or tabulated, as desired, and so on. Accordingly, it should be understood that the scope of this invention is not limited to the illustrated embodiment, and that controls incorporating such modifications may fall within the intended breadth of the appended claims.

What is claimed is:

1. A method of generating heating, ventilation and air conditioning (HVAC) commands for a motor vehicle automatic climate control, the method comprising the steps of:

calibrating a schedule of steady-state HVAC command values for maintaining a vehicle cabin at a set temperature of the automatic climate control under diverse ambient conditions;

periodically determining a temperature in the vehicle cabin, including a starting value of such temperature upon activation of said automatic climate control;

periodically measuring ambient conditions, including a starting ambient condition upon activation of said automatic climate control;

setting said HVAC commands at initial values based on said starting ambient condition, said starting value of cabin temperature and said set temperature;

computing a transient phase modifier based on the determined cabin temperatures and said set temperature;

retrieving scheduled steady-state HVAC command values based on said set temperature and said periodically measured ambient condition; and using said transient phase modifier to adjust said HVAC commands from said initial values toward the retrieved steady-state command values during a transient phase in which the determined cabin temperature is brought into correspondence with said set temperature, and thereafter setting said HVAC commands in accordance with said schedule of steady-state HVAC command values.

2. The method of claim 1, wherein the step of computing a transient phase modifier includes the step of:

computing a transient phase indicator according to a deviation of the periodically determined cabin temperature from said set temperature, relative to the deviation of said starting value of cabin temperature from said set temperature.

3. The method of claim 1, wherein the step of computing a transient phase modifier includes the steps of:
   computing a transient phase indicator according to a deviation of the periodically determined cabin temperature from said set temperature, relative to the deviation of said starting value of cabin temperature from said set temperature; and
   computing the transient phase modifier as a function of said transient phase indicator.

4. The method of claim 3, wherein said transient phase modifier (TMOD) is computed according to:

$$TMOD = TPI^n$$

where TPI is said transient phase indicator, and n is an exponent calibrated to provide a desired response of said automatic climate control during said transient phase.

5. The method of claim 2, including the steps of:
   holding the HVAC commands at said initial values until said transient phase indicator reaches a predetermined threshold; and
   after said transient phase indicator reaches said threshold, using said threshold and said transient phase modifier to adjust said HVAC commands from said initial values toward the retrieved steady-state command values.

6. The method of claim 1, including the steps of:
   computing a transient phase indicator (TPI) according to a deviation of the periodically determined cabin temperature from said set temperature, relative to the deviation of said starting value of cabin temperature from said set temperature;
   holding the HVAC commands at said initial values until TPI reaches a predetermined threshold;
   computing the transient phase modifier (TMOD) as a function of TPI and said threshold; and
   after TPI reaches said threshold, using TMOD to adjust said HVAC commands from said initial values toward the retrieved steady-state command values.

7. The method of claim 6, wherein said transient phase modifier (TMOD) is computed according to:

$$TMOD = (TPI/TPI_{thr})^n$$

where $TPI_{thr}$ is said predetermined threshold, and n is an exponent calibrated to provide a desired response of said automatic climate control during said transient phase.

8. The method of claim 1, including the steps of:
   determining initial adjustment values for said HVAC commands based on a deviation of said starting value of cabin temperature from said set temperature; and
   setting said HVAC commands at initial values based on a sum of said retrieved steady-state command values and said initial adjustment values.

9. The method of claim 1, including the step of:
   setting said HVAC command values according to:

$$HVAC\_CMD = HVAC\_CMD\_SS + (TMOD * DELTA\_HVAC\_CMD)$$

where HVAC_CMD is an HVAC command, HVAC_CMD_SS is a scheduled steady-state value for such HVAC command, TMOD is said transient phase modifier, and DELTA_HVAC_CMD is an initial adjustment value for said HVAC command based on a deviation of said starting value of cabin temperature from said set temperature.

10. The method of claim 9, wherein said transient phase modifier (TMOD) is computed according to:

$$TMOD = TPI^n$$

where TPI is a transient phase indicator determined according to a deviation of the periodically determined cabin temperature from said set temperature, relative to the deviation of said starting value of cabin temperature from said set temperature, and n is an exponent calibrated to provide a desired response of said automatic climate control during said transient phase.

11. The method of claim 1, including the step of:
   setting said HVAC command values according to:

$$HVAC\_CMD = (TMOD * HVAC\_INIT) + [(1 - TMOD) * HVAC\_SS]$$

where HVAC_CMD is an HVAC command, HVAC_CMD_SS is a scheduled steady-state value for such HVAC command, TMOD is said transient phase modifier, and HVAC_INIT is an initial value for said HVAC command based on said starting ambient condition, said starting value of cabin temperature and said set temperature.

12. The method of claim 11, wherein said transient phase modifier (TMOD) is computed according to:

$$TMOD = TPI^n$$

where TPI is a transient phase indicator determined according to a deviation of the periodically determined cabin temperature from said set temperature, relative to the deviation of said starting value of cabin temperature from said set temperature, and n is an exponent calibrated to provide a desired response of said automatic climate control during said transient phase.

13. The method of claim 2, including the step of:
   using said transient phase modifier to: (1) adjust said HVAC commands from said initial values to interim values intermediate said initial values and the retrieved steady-state command values, and (2) adjust said HVAC commands from said interim values to the retrieved steady-state command values.

14. The method of claim 13, including the steps of:
   holding the HVAC commands at said initial values until said transient phase indicator reaches a first predetermined threshold; and
   holding the HVAC commands at said interim values until said transient phase indicator reaches a second predetermined threshold.

15. The method of claim 13, including the steps of:
   holding the HVAC commands at said initial values until said transient phase indicator (TPI) reaches a first predetermined threshold;
   computing the transient phase modifier (TMOD) as a function of TPI and said first threshold;
   after TPI reaches said first threshold, using TMOD to adjust said HVAC commands from said initial values to said interim values;
   holding the HVAC commands at said interim values until TPI reaches a second predetermined threshold;
   computing the transient phase modifier (TMOD) as a function of TPI and said second threshold; and
   after TPI reaches said second threshold, using TMOD to adjust said HVAC commands from said interim values to the retrieved steady-state command values.

* * * * *